United States Patent
Gansohr

(10) Patent No.: US 9,002,599 B2
(45) Date of Patent: Apr. 7, 2015

(54) METHOD TO CONTROL A TRANSMISSION BRAKE

(71) Applicant: ZF Friedrichshafen AG, Friedrichshafen (DE)

(72) Inventor: Marcus Gansohr, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 14 days.

(21) Appl. No.: 14/028,607

(22) Filed: Sep. 17, 2013

(65) Prior Publication Data

US 2014/0081539 A1 Mar. 20, 2014

(30) Foreign Application Priority Data

Sep. 18, 2012 (DE) .......................... 10 2012 216 595

(51) Int. Cl.
*F16H 61/04* (2006.01)
*F16H 61/682* (2006.01)
*F16H 61/68* (2006.01)

(52) U.S. Cl.
CPC ............ *F16H 61/68* (2013.01); *F16H 61/0403* (2013.01); *F16H 61/682* (2013.01); *F16H 2061/0411* (2013.01)

(58) Field of Classification Search
CPC .............. F16H 61/0403; F16H 61/682; F16H 2061/0411
USPC ........................................................... 701/53
See application file for complete search history.

(56) References Cited

U.S. PATENT DOCUMENTS

2012/0330519 A1* 12/2012 Gansohr .......................... 701/51
2012/0330520 A1* 12/2012 Ulbricht .......................... 701/51

FOREIGN PATENT DOCUMENTS

| DE | 102 24 064 A1 | 12/2003 |
| DE | 10 2010 002 764 A1 | 9/2011 |
| WO | WO 2011110399 A1 * | 9/2011 |
| WO | WO 2011110400 A1 * | 9/2011 |

* cited by examiner

*Primary Examiner* — Fadey Jabr
*Assistant Examiner* — Aaron L Troost
(74) *Attorney, Agent, or Firm* — Davis & Bujold, PLLC; Michael J. Bujold

(57) ABSTRACT

A method of controlling a transmission brake of an automated change-speed transmission, of a countershaft design provided with claw clutches, the brake being functionally connected, on its input side, to a transmission shaft and actuated hydraulically or pneumatically by way of inlet and outlet valves such that, for an upshift from a gear under load to a target gear, when the loaded gear is disengaged, in order to synchronize the target gear, first the inlet valve is opened and the outlet valve is closed, then to produce a substantially constant braking torque, the inlet valve is closed after having been open for a determinable opening duration, and to reach a synchronous rotational speed, the outlet valve is opened after having been closed for a determinable closing duration. The time during which the inlet valve is open is determined as a function of a specified characteristic parameter of the synchronization process.

10 Claims, 3 Drawing Sheets

METHOD TO CONTROL A TRANSMISSION BRAKE

This application claims priority from German patent application serial no. 10 2012 216 595.9 filed Sep. 18, 2012.

FIELD OF THE INVENTION

The invention concerns a method for controlling a transmission brake of an automated change-speed transmission that is of countershaft design and is provided with claw clutches, the brake being functionally connected on its input side to a transmission shaft and being actuated hydraulically or pneumatically by means of an inlet valve and an outlet valve, each of these being in the form of a 2/2-way magnetic switching valve, such that for an upshift from a gear under load to a target gear, when the loaded gear has been disengaged, to synchronize the target gear first the inlet valve is opened and the outlet valve is closed, then to produce a braking torque the inlet valve is closed after having been open for a certain time, and to reach a synchronous rotational speed the outlet valve is opened after having been closed for a certain time, the time for which the inlet valve is open determined as a function of a specified characteristic parameter of the synchronization process.

BACKGROUND OF THE INVENTION

A transmission that is designed for longitudinal mounting and is of countershaft structure usually has an input shaft, at least one countershaft and an output shaft. The input shaft can be connected to the driveshaft of the drive engine and separated therefrom by an engine clutch which acts as a starting and shifting clutch. The countershaft is arranged with its axis parallel to the input shaft and is in permanent driving connection therewith by way of an input constant usually formed by a spur gear pair with two fixed wheels arranged in a rotationally fixed manner on the respective transmission shaft (input shaft and countershaft). The output shaft is arranged axis-parallel to the countershaft and coaxially with the input shaft, and can be connected selectively to the countershaft by way of a number of gear steps with different transmission ratios. The gear steps are usually in the form of spur gear steps, each comprising a fixed wheel arranged in a rotationally fixed manner on one transmission shaft (countershaft or output shaft) and a loose wheel mounted to rotate on the other transmission shaft (output shaft or countershaft). To engage a gear, i.e. to form a driving connection between the countershaft and the output shaft with the transmission ratio of the spur gear step concerned, a gear clutch is associated with each loose wheel. The loose wheels of adjacent spur gear steps are usually arranged at least in pairs on the same transmission shaft, so that the gear clutches can correspondingly be combined in pairs in dual shifting elements, each having a common shifting sleeve.

The shifting sequence for an upshift from a gear under load to a higher, target gear generally begins when the torque delivered by the drive engine is reduced and approximately at the same time the engine clutch is opened, before the loaded gear is disengaged. This is followed by synchronization of the target gear, in which the input rotational speed, i.e. the speed determined by that of the input shaft or the countershaft at the input-side part of the gear clutch of the target gear, is reduced to the synchronous speed at the output-side part of the gear clutch of the target gear, which is determined by the rotational speed of the output shaft. Thereafter the target gear is engaged and then, at approximately the same time, the engine clutch is closed and the torque produced by the drive engine is increased again.

In automated transmissions the input rotational speed is usually detected by a speed sensor arranged on the input shaft, whereas the output speed is detected by a speed sensor arranged on the output shaft. For comparability of the two speeds it is necessary to relate them to a common transmission shaft, i.e. to convert them correspondingly. However, since particularly when the loose wheels on the countershaft and the output shaft are arranged in alternating pairs it would be relatively complicated to convert the rotational speeds in each case to the respectively relevant transmission shaft associated with the gear clutch of the target gear concerned, it is usual to relate the two speeds, in each case independently of the arrangement of the loose wheel concerned, uniformly to the same transmission shaft, preferably the input shaft. For this it is only necessary to convert the output rotational speed detected at the output shaft, by multiplication by the gear ratio of the target gear and the gear ratio of the input constant to the input shaft, whereas the input speed detected at the input shaft itself can be retained unchanged. Here the rotational speed conversion, which is known per se, will not be explained explicitly; rather, the input speed and the output speed will be understood to mean the respective rotational speeds already related to a common transmission shaft, in particular the input shaft.

In general, compared with gear clutches synchronized by means of friction rings and locking teeth, unsynchronized gear clutches known as claw clutches have a considerably more simple structure, lower production costs and more compact dimensions, and are substantially less prone to wear and defects. In an automated transmission fitted with claw clutches, during an upshift the target gear is preferably synchronized by means of a centrally arranged, controllable brake device, such as a transmission brake functionally connected to the input shaft or to the countershaft. Compared with control-path-dependent, adjustment-speed variable and adjustment-force-variable control of a shift-control element for synchronizing and engaging a synchronized target gear, the control of a transmission brake and of a shift-control element for synchronizing and engaging an unsynchronized target gear is comparatively simple since in essence the sensor data from the rotational speed sensors on the input and output shafts are sufficient for that purpose.

A typical transmission brake of an automated transmission of countershaft design is described, for example, in DE 10 2010 002 764 A1 with reference to FIG. 4 thereof. This known transmission brake is in the form of a pneumatically actuated disk brake and is arranged on the engine-side end of the countershaft of the transmission. The disks of the transmission brake are connected in alternation in a rotationally fixed manner, by means of inner and outer locking teeth, to the countershaft and to a brake housing mounted fixed on the transmission housing. The transmission brake is actuated by means of a piston arranged to move axially in a brake cylinder, which piston is acted upon axially on the outside by the controllable control pressure in the pressure chamber of the brake cylinder and is thereby pressed against the disks in opposition to the restoring force of a spring arranged between the piston and the countershaft. The control pressure acting in the pressure chamber is controlled by means of an inlet valve connected on the inlet side to a pressure line and an outlet valve connected on the outlet side to an unpressurized line, which on the outlet and inlet sides are respectively connected to the pressure chamber of the brake cylinder by way of a short duct in each case. In this case the two valves are in the form of 2/2-way magnetic switching valves, which are relatively inexpensive and which enable simple control sequences. Since in the deactivated condition the transmission brake should reliably remain open without energy consumption, in the non-actuated, i.e. de-energized condition the inlet valve is closed whereas in the non-actuated condition the outlet valve is open.

During the synchronization process of an upshift the two valves are generally controlled in such manner that when the loaded gear has been disengaged, at approximately the same time the inlet valve is opened and the outlet valve is closed. Thereby the pressure medium flows out of the pressure line into the pressure chamber of the transmission brake which is closed on the outlet side and the piston presses the inner and outer disks against one another, so that a braking torque is produced which brakes the input shaft. When the braking torque required for synchronizing the target gear has built up, the inlet valve is closed. This traps the pressure medium inside the pressure chamber of the transmission brake, whereby the braking torque of the transmission brake is kept constant. To reach the synchronous speed and avoid overbraking the input shaft, the outlet valve is opened at just the right time before the synchronous speed has been reached so that the pressure medium can flow out of the pressure chamber of the transmission brake into the unpressurized line, which causes the braking torque to fall, i.e. the transmission brake is deactivated.

Previous known methods for controlling a transmission of this type are limited, during a braking of the input shaft necessitated by an upshift, with a braking gradient applied by the transmission brake, to determining the optimum time for opening the outlet valve, i.e. for deactivating the transmission brake.

DE 102 24 064 B4 describes a corresponding method for controlling a transmission brake, in which when the transmission brake has been activated, the input rotational speed is extrapolated by means of the input speed gradient and the deactivation time of the transmission brake is determined in such manner that when the target gear is engaged, the input speed corresponds within a specified tolerance to the synchronous speed determined by the output speed. For the determination of the deactivation time a deactivation lag time of the transmission brake and an output speed gradient are taken into account, which are attributable to a resultant resistance torque acting on the output shaft and which give rise to a corresponding change of the synchronous speed. However, in this known method the reduction of the braking torque during the deactivation of the transmission brake is perceived as an unsteady or abrupt process that does not exactly match reality and leads to a certain imprecision of the method.

In contrast, in the method known from DE 10 2010 002 764 A1 for controlling a transmission brake it is provided that for the determination of the deactivation time of the transmission brake, in addition to a deactivation lag time of the transmission brake and an output rotational speed gradient, i.e. a change of the synchronous speed, a steady reduction of the braking torque during the deactivation process of the transmission brake is also taken into account. For this the reduction of the input speed gradient brought about by the braking torque of the transmission brake is described by a quadratic time function whose quadratic portion is weighted by a transmission-specific and brake-specific deactivation factor $F_{Abs}$ of the transmission brake. This improved method enables a substantially more accurate determination of the deactivation time of the transmission brake.

Basically, a synchronization process carried out by the transmission brake during an upshift should take place as quickly as possible. However, to be able to reliably determine the optimum time for opening the outlet valve, i.e. for deactivating the transmission brake, the input speed gradient has to be determined relatively precisely. But for an accurate determination of the input speed gradient from the speed signal of a rotational speed sensor arranged on the input shaft, a minimum steady application time of the transmission brake is necessary during which the braking torque of the transmission brake and hence the input speed gradient are substantially constant, since when the engine clutch is opened and the loaded gear is disengaged the input shaft usually undergoes rotation fluctuations and the rotational speed signal concerned can be 'noisy'.

During the synchronization of the target gear by means of the transmission brake it should also be taken into account that the supply pressure in the pressure line of the transmission brake can fluctuate, so that the maximum braking torque of the transmission brake that can be set is limited. For example, this is the case if the pressure line is connected not to a system pressure line with a largely constant, high system pressure, but to a shifting pressure line of the transmission in which, by virtue of an associated pressure regulating valve, shift-dependent shifting pressures of varying size are produced. However, to produce a particular braking torque by means of the transmission brake, if the supply pressure is lower a longer opening duration of the inlet valve is needed that with a higher supply pressure. In addition the production of a particular braking torque is made more difficult because the transmission brake is not usually provided with a pressure sensor by means of which the brake pressure present in the pressure chamber of the transmission brake could be determined.

SUMMARY OF THE INVENTION

Accordingly, the purpose of the present invention is to indicate a method for controlling a transmission brake of the type mentioned at the start, of an automated change-speed transmission of countershaft design having claw clutches, by means of which method, during an upshift process and for a predetermined characteristic parameter of the synchronization process, the optimum opening duration or the corresponding deactivation time of the inlet valve of the transmission brake can be determined.

With the characteristics described below, this objective is achieved by first detecting by means of sensors the input rotational speed $n_{E\_0}$ and the corresponding output speed $n_{A\_0}$, existing at the beginning of the synchronization process (t=0), from these determining the input speed gradient $ng_{E\_W}$ and the corresponding output speed gradient $ng_A$ existing before the activation of the transmission brake, then, using these values and with transmission-specific and brake-specific characteristic values, determining for a specified application duration $T_H$ of the transmission brake at a constant braking torque $M_{Br}$ the necessary braking gradient $ng_{E\_Br}$ of the input shaft, then determining the brake pressure $p_{Br}$ to be produced in the transmission brake in order to obtain the braking gradient $ng_{E\_Br}$, and finally determining the opening duration $T_{VE}$ of the inlet valve required in order to produce the brake pressure $p_{Br}$, as a function of the pressure $p_V$ being supplied to the transmission brake at the time.

Advantageous design features and further developments of the method according to the invention are also discussed below.

Thus, the invention begins from a transmission brake which is arranged in an automated change-speed transmission of countershaft design provided with claw clutches and which is functionally connected on its input side to a transmission shaft, i.e. to the input shaft or a countershaft. In addition the invention assumes that the transmission brake can be actuated hydraulically or pneumatically by means of an inlet valve and an outlet valve, each in the form of a 2/2-way magnetic switching valve. In an upshift from a gear under load to a target gear, after the loaded gear has been disengaged, in order to synchronize the target gear first the inlet valve of the transmission brake is opened and the outlet valve is closed. To produce a substantially constant braking torque $M_{Br}$, after a determinable opening duration $T_{VE}$ the inlet valve is closed again and, to reach a synchronous speed determined by the output speed $n_A$, the outlet valve is opened again after a determinable closing duration $T_{VA}$. The stated objective of the present invention is now to determine the opening duration $T_{VE}$ of the inlet valve as a function of a specified characteristic parameter of the synchronization process.

For that purpose it is provided that in a first process step the input rotational speed $n_{E\_0}$ and the corresponding output speed $n_{A\_0}$ existing at the beginning of the synchronization process (t=t0) are detected by sensors. From these values the input speed gradient $ng_{E\_W}$ and the corresponding output speed gradient $ng_A$ existing before the transmission brake is activated are then determined. Since, despite the open inlet valve and the closed outlet valve, owing to an activation lag time $T_1$ the transmission brake has not yet built up any braking torque $M_{Br}$, the existing input speed gradient $ng_E$ corresponds to a drag gradient $ng_{E\_W}$ which is caused by a resistance torque that acts upon the input shaft and the countershaft and is the result of bearing, gearing and splash resistances. The output speed gradient $ng_A$ corresponds to the rotational speed gradient of the output shaft converted relative to the input shaft, which owing to the drive connection to the drive wheels is determined by the acceleration or deceleration of the motor vehicle during the shift-related interruption of the traction or thrust force.

In good agreement with the actual rotational speed variations of the input speed $n_E$ and the output speed $n_A$, the drag gradient $ng_{E\_W}$ of the input shaft until the beginning of the braking force build-up by the transmission brake and the output speed gradient $ng_A$ until the engagement of the target gear can in each case be assumed to be constant and, in a manner known per se, they can each be calculated as a difference quotient of two actual, consecutively determined speed values $n_{E\_i}$, $n_{E\_i+1}$; $n_{A\_i}$, $n_{A\_i+1}$ and the time interval $t_{i+1}-t_i$ between the detection of the speed values, in accordance with the equations:

$$ng_{E\_W}=(n_{E\_i+1}-n_{E\_i})/(t_{i+1}-t_i)$$

and $$ng_A=(n_{A\_i+1}-n_{A\_i})/(t_{i+1}-t_i)$$

In these $n_{E\_i}$ and $n_{A\_i}$ are the values of the input speed $n_E$ and the output speed $n_A$, respectively determined at time $t_i$, whereas $n_{E\_i+1}$ and $n_{A\_i+1}$ are the corresponding rotational speed values determined at the next time point $t_{i+1}$.

Since the speed signals $n_E(t)$, $n_A(t)$ detected by rotational speed sensors can be affected by noise and/or by superimposed oscillations, for the above determination of the speed gradients $ng_{E\_W}$, $ng_A$ it may be necessary to carry out a prior smoothing of the speed signal concerned, for example by low-pass filtering or in the form of a complicated numerical method for determining the speed gradients $ng_{E\_W}$, $ng_A$.

From these values just mentioned ($n_{E\_0}$, $n_{A\_0}$, $ng_{E\_W}$, $ng_A$) and with transmission-specific and brake-specific characteristic parameters such as the activation lag time $T_1$ of the transmission brake, a deactivation lag time $T_4$ of the transmission brake, and a deactivation factor $F_{Abs}$ which is known from DE 10 2010 002 764 A1 and which characterizes the braking force reduction of the transmission brake, for a specified application duration $T_H$ of the transmission brake at a constant braking torque ($M_{Br}$=const.) the required braking gradient $ng_{E\_Br}$ of the input shaft is then determined. The application duration $T_H$ of the transmission brake used according to the invention as the characteristic parameter of the synchronization process is specified in such manner that the braking torque $M_{Br}$ of the transmission brake and hence the braking gradient $ng_{E\_Br}$ of the input shaft are kept constant for long enough to make possible an accurate determination of the braking gradient $ng_{E\_Br}$.

In a second process step the brake pressure $p_{Br}$ to be produced in the transmission brake in order to produce the braking gradient $ng_{E\_Br}$ of the input shaft is then determined.

Then, in a third process step the opening duration $T_{VE}$ of the inlet valve required in order to produce the brake pressure $p_{Br}$ is determined as a function of the pressure $p_V$ currently being supplied to the transmission brake.

Thus, this method for controlling a transmission brake makes it possible to determine the optimum opening duration $T_{VE}$ or the deactivation time point of the inlet valve of the transmission brake for a specified application duration $T_H$. With this method, other, known methods can be extended, in particular the method known from DE 10 2010 002 764 A1 for controlling a transmission brake, with which the optimum closing duration $T_{VA}$ or deactivation time point of the outlet valve of the transmission brake for a given braking gradient $ng_{E\_Br}$ can be determined.

In principle the braking gradient $ng_{E\_Br}$ of the input shaft, the brake pressure $p_{Br}$ to be produced in the transmission brake and the necessary opening duration $T_{VE}$ of the inlet valve can be determined concretely in each case by an appropriate calculation method or with reference to previously determined characteristic curves or performance characteristics stored in a data memory of the transmission control unit.

However, it is preferable for the necessary braking gradient $ng_{E\_Br}$ of the input shaft to be determined from the specified application duration $T_H$ and the rotational speeds $n_{E\_0}$, $n_{A\_0}$ at the beginning of the synchronization process (t=t0), whether these are determined by sensors or calculated, as well as the speed gradients $ng_{E\_W}$, $ng_A$, using the equation:

$$ng_{E\_Br}=F_{Abs}*T_H-ng_{E\_W}+2\ ng_A+\{(F_{Abs}*T_H-ng_{E\_W}+2\ ng_A)^2+2\ F_{Abs}[n_{E\_0}-n_{A\_0}+(T_1+T_H)(ng_{E\_W}-2\ ng_A)]\}^{1/2}$$

in which $F_{Abs}$ denotes the transmission-specific and brake-specific deactivation factor of the transmission brake and $T_1$ denotes the device-specific activation lag time of the transmission brake. This equation can be derived from the given functional relationships with a few simplifications.

The transmission-specific and brake-specific deactivation factor $F_{Abs}$ of the transmission brake can be stored in a data memory of the transmission control unit in the form of a characteristic curve or a performance characteristic. However, the deactivation factor $F_{Abs}$ can also be calculated in each case at the time, using the equation:

$$F_{Abs}=-M_{Br}/(J_{GE}*4\pi*T_5)$$

in which $M_{Br}$ denotes the braking torque of the transmission brake at the beginning of a deactivation process, $J_{GE}$ denotes the mass moment of inertia of the input shaft and of the transmission shafts and gearwheels in driving connection with it, and $T_5$ denotes the time taken to deactivate the transmission brake on the assumption that the braking torque $M_{Br}$ decreases in a linear manner.

The brake pressure $p_{Br}$ to be produced in the transmission brake increases linearly with the size of the necessary braking gradient $ng_{E\_Br}$ and can therefore be determined from a corresponding characteristic line or calculated using the equation:

$$p_{Br} = p_{Br\_0} - ng_{E\_Br} * F_{Br}$$

in which $p_{Br\_0}$ is a device-specific pressure offset of the transmission brake that corresponds to the spring force of a brake-internal restoring spring and $F_{Br}$ is a device-specific proportionality factor of the transmission brake.

The proportionality factor $F_{Br}$ of the transmission brake is not a constant but can vary as a function of changes of the friction coefficient of the friction linings of the transmission brake, i.e. as a function of the wear condition and the current operating temperature of the transmission brake. It is therefore provided that the proportionality factor $F_{Br}$ of the transmission brake is corrected as a function of deviations of the actual braking gradient $ng_{E\_Br\_ist}$ of the input shaft from the braking gradient $ng_{E\_Br}$ to be produced, in the sense that if the deceleration of the input shaft is too slow ($|ng_{E\_Br\_ist}|<|ng_{E\_Br}|$) the proportionality factor $F_{Br}$ is increased by a defined correction step width $\Delta F_K$:

$$(F_{Br} = F_{Br} + \Delta F_K)$$

whereas if the deceleration of the input shaft is too rapid ($|ng_{E\_Br\_ist}|>|ng_{E\_Br}|$) the proportionality factor $F_{Br}$ is reduced by a defined correction step width $\Delta F_K$:

$$(F_{Br} = F_{Br} - \Delta F_K).$$

In order to avoid the correction of brief and in part oppositely directed deviations of the actual braking gradient $ng_{E\_Br\_ist}$ of the input shaft from the braking gradient $ng_{E\_Br}$ to be produced, it is preferably provided that the proportionality factor $F_{Br}$ of the transmission brake is only corrected if, over a defined number of synchronization processes, deviations of the actual braking gradient $ng_{E\_Br\_ist}$ of the input shaft from the braking gradient $ng_{E\_Br}$ to be produced, which are all in the same direction, have been detected.

However, if the brake pressure $p_{Br}$ to be produced in the transmission brake is higher than the pressure $p_V$ currently being supplied to the transmission brake ($p_{Br} > p_V$), i.e. because the supply pressure $p_V$ is too low the brake pressure $p_{Br}$ required cannot even be produced, it is provided that in such a case a deviation of the actual braking gradient $ng_{E\_Br\_ist}$ of the input shaft from the braking gradient $ng_{E\_Br}*$ calculated using the current supply pressure $p_V$ by means of the equation $ng_{E\_Br}* = (p_{Br\_0} - p_V)/F_{Br}$ is evaluated for a correction of the proportionality factor $F_{Br}$.

The necessary opening duration $T_{VE}$ of the inlet valve can be determined, with the brake pressure $p_{Br}$ of the transmission brake to be produced therein, from a family of several characteristic curves determined for different supply pressures $p_V$.

However, it is also possible for the necessary opening duration $T_{VE}$ of the inlet valve, with the brake pressure $p_{Br}$ to be produced in the transmission brake, to be determined from a single characteristic curve which has been determined from a family of several characteristic curves determined for different supply pressures $p_V$.

In this case, however, a deviation of the actual braking gradient $ng_{E\_Br\_ist}$ of the input shaft from the braking gradient $ng_{E\_Br}$ to be produced should not be taken into account for a correction of the proportionality factor $F_{Br}$ if the opening duration $T_{VE}$ of the inlet valve is in a range with large deviations of the characteristic curves determined for different supply pressures $p_V$, from which the characteristic curves used was determined.

But if the brake pressure $p_{Br}$ to be produced in the transmission brake is higher than the current supply pressure $p_V$ of the transmission brake ($p_{Br} > p_V$) and can therefore not even be reached, it is provided in such a case that the necessary opening duration $T_{VE}$ of the inlet valve is taken to be a predetermined maximum opening duration $T_{VE\_max}$ ($T_{VE} = T_{VE\_max}$)

BRIEF DESCRIPTION OF THE DRAWINGS

For the further clarification of the invention the description of drawings are attached, which illustrate an example embodiment and which show.

DETAILED DESCRIPTION OF THE PREFERRED EMBODIMENTS

Figure 1:
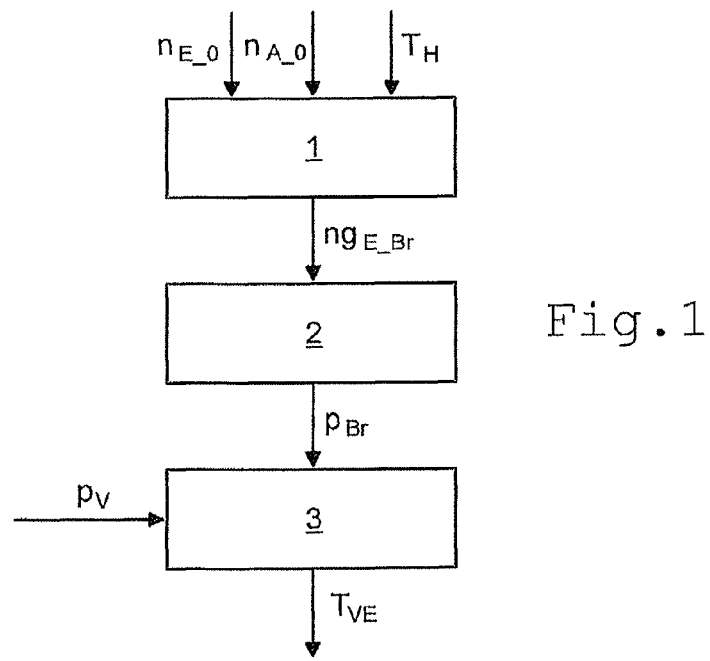
FIG. 1 A flow-chart diagram of the method according to the invention for controlling a transmission brake, FIGS. 2a-2c The time variations of the input-side and output-side rotational speeds and the input-side speed gradients and switching times of the control valves of the transmission brake during the synchronization process for an upshift, FIGS. 3a and 3b A simplified time variation of the input-side rotational speed gradient and the switching times of the inlet valve and the outlet valve of the transmission brake during the synchronization process for the upshift according to FIG. 2, FIG. 4 A characteristic line for determining the necessary brake pressure as a function of the braking gradient to be produced, and FIG. 5 A family of characteristic curves for determining the opening time of the outlet valve as a function of the brake pressure to be produced and of the pressure supplied to the transmission brake.

According to the flow-chart of FIG. 1 the method for controlling a transmission brake, by means of which the opening duration $T_{VE}$ of the inlet valve of the transmission brake for a specified synchronization duration $T_S$ is determined, is divided into three process steps 1, 2 and 3.

In the first process step 1 the input rotational speed $n_{E\_0}$ existing at the beginning of the synchronization process (t=t0) and the corresponding output speed $n_{A\_0}$ are detected by sensors, from these the input speed gradient $ng_{E\_W}$ existing before the activation of the transmission brake and the corresponding output speed gradient $ng_A$ are determined, and from those values as well as with transmission-specific and brake-specific characteristic parameters the braking gradient $ng_{E\_Br}$ of the input shaft required for the specified application duration $T_H$ of the transmission brake is determined.

In the second process step 2 the brake pressure $p_{Br}$ to be produced in the transmission brake in order to obtain the braking gradient $ng_{E\_Br}$ of the input shaft is determined.

In the third process step 3 the opening duration $T_{VE}$ of the inlet valve required in order to obtain the brake pressure $p_{Br}$ is determined as a function of the pressure $p_V$ currently being supplied to the transmission brake.

Below, it will now be described how, in the first process step 1, the necessary braking gradient $ng_{E\_Br}$ of the input shaft is determined, how, in the second process step 2, the brake pressure $p_{Br}$ to be produced in the transmission brake is determined and how, in the third process step 3, the necessary opening duration $T_{VE}$ of the inlet valve is determined.

Figure 2A:
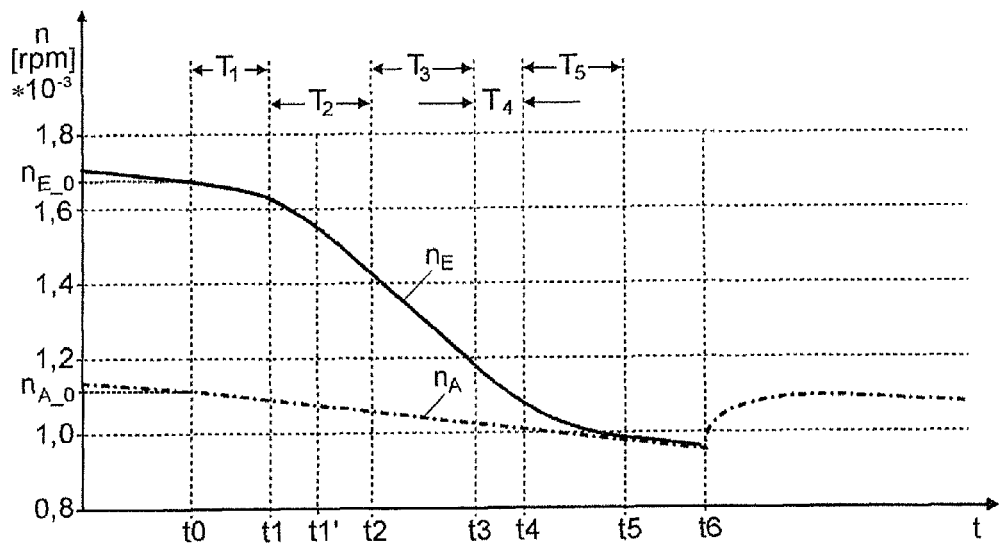
Figure 2B:
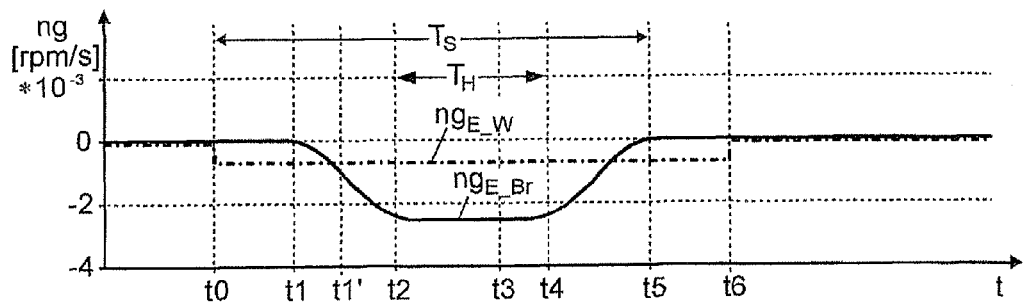
Figure 2C:
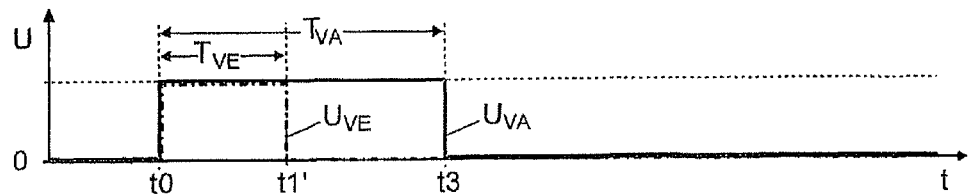

For a better understanding of the control sequences, in the three-part diagram of FIGS. 2a-2c the part-diagram FIG. 2a shows the time variations of the input-side and output-side rotational speeds $n_E(t)$, $n_A(t)$, the part-diagram FIG. 2b shows the time variations of the input-side speed gradients, i.e. the drag gradient $ng_{E\_W}$ and the braking gradient $ng_{E\_Br}$, while the part-diagram FIG. 2c shows the switching times of the control valves of the transmission brake, i.e. the opening time $T_{VE}$ of the inlet valve and the closing time $T_{VA}$ of the outlet valve, during the synchronization process for an upshift.

The synchronization process begins at time t0, when the gear under load is disengaged and the two control valves of the transmission brake are activated, namely the inlet valve is opened and the outlet valve is closed. The rotational speed difference $\Delta n$ to be bridged by the input shaft by virtue of the transmission brake during the synchronization process is given by the difference between the current output speed $n_{A\_0}$ and the current input speed $n_{E\_0}$ as well as the change $ng_A * T_S$ of the output speed that takes place during the synchronization duration $T_S$, so that the equation $\Delta n = n_{A\_0} - n_{E\_0} + ng_A * T_S$ applies (FIG. 2a).

The output speed gradient $ng_A$ is determined by the acceleration or deceleration of the motor vehicle during the shift-related traction force interruption. From time t0 the input shaft is subjected to the action of a resistance torque which results from the bearing, gearing and splash resistances acting on the input shaft and the countershaft. Consequently, during the shift-related traction force interruption the input shaft is slowed down with a drag gradient $ng_{E\_W}$ (FIG. 2b). The rotational speeds $n_{E\_0}$, $n_{A\_0}$ existing at the beginning of the synchronization process (t=t0) are detected by sensors and from them, taking note of at least two consecutive values, the corresponding gradients $ng_{E\_W}$, $ng_A$ are determined (FIGS. 2a, 2b).

After the lapse of an activation lag time $T_1$ of the transmission brake, at time t1 the build-up of the braking torque begins and this is completed after the lapse of an activation duration $T_2$ of the transmission brake, namely at time t2. Thus, from time t2 onward the substantially constant braking torque $M_{Br}$ is applied to the input shaft so that the shaft, in addition to the drag gradient $ng_{E\_W}$, is also slowed down by the braking gradient $ng_{E\_Br}$ which is constant from that time (FIG. 2b). After the lapse of the still to be determined opening duration $T_{VE}$ of the inlet valve already during the activation duration $T_2$ of the transmission brake, the inlet valve is deactivated, i.e. closed at time t1' (FIG. 2c).

After the lapse of a time interval $T_3$ during which the braking torque $M_{Br}$ is constant, at time t3 the outlet valve is deactivated, i.e. opened, and for this the corresponding closed duration $T_{VA}$ of the outlet valve is preferably determined in accordance with the method known from DE 10 2010 002 764 A1. After the lapse of a deactivation lag time $T_4$ of the transmission brake, during which the braking torque $M_{Br}$ still remains constant, at time t4 the reduction of the braking torque of the transmission brake begins and this is completed after the lapse of a deactivation duration $T_5$ of the transmission brake, namely at time t5. From time t5 onward the input shaft is still acted upon only by the resultant resistance torque, so that now it is still slowed down by the drag gradient $ng_{E\_W}$ only, until at time t6, the target gear is engaged (FIGS. 2a, 2b).

Accordingly, the synchronization duration $T_S$ is the sum of the five above-mentioned partial time intervals $T_1$, $T_2$, $T_3$, $T_4$ and $T_5$, in accordance with the equation:

$$T_S = T_1 + T_2 + T_3 + T_4 + T_5$$

The application duration $T_H$ specified in the method according to the invention, during which the transmission brake is kept applied at a constant braking torque ($M_{Br}$=const.), extends over the time intervals $T_3$ and $T_4$, so that the equation $T_H = T_3 + T_4$ applies.

Thus, and on the assumption—confirmed with sufficient accuracy in practice—that the build-up of the braking torque $M_{Br}$ of the transmission brake takes the same length of time as the decrease of the braking torque $M_{Br}$ ($T_2 = T_5$), the overall relationship can be simplified to:

$$T_S = T_1 + T_H + 2T_5$$

Likewise, the rotational speed difference $\Delta n$ bridged during the synchronization duration $T_S$ of the input shaft is the sum of the speed differences $\Delta n_1$, $\Delta n_2$, $\Delta n_3$, $\Delta n_4$ and $\Delta n_5$ bridged during the individual part-intervals $T_1$, $T_2$, $T_3$, $T_4$ and $T_5$, i.e.:

$$\Delta n = \Delta n_1 + \Delta n_2 + \Delta n_3 + \Delta n_4 + n_5$$

On the assumption confirmed with sufficient accuracy in practice —that during the build-up of the braking torque $M_{Br}$ of the transmission brake the rotational speed difference bridged is the same as during the reduction of the braking torque ($\Delta n_2 = \Delta n_5$), this relationship simplifies to:

$$\Delta n = \Delta n_1 + \Delta n_3 + \Delta n_4 + 2\Delta n_5$$

Figure 3A:
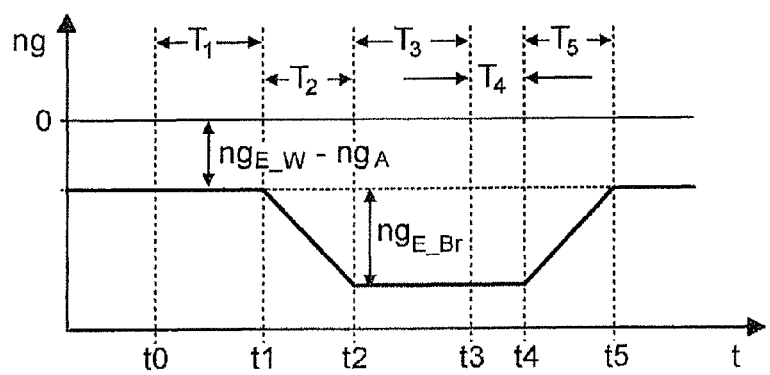
Figure 3B:
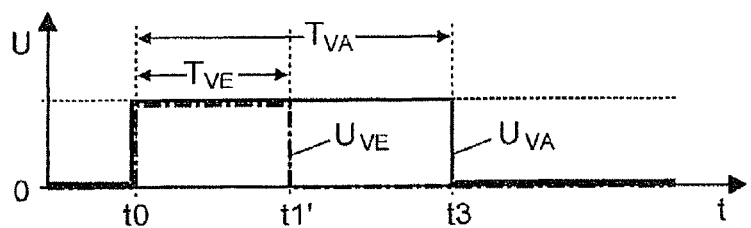

For a more accurate consideration of the speed gradients $ng_{E\_W}$, $ng_{E\_Br}$ and $ng_A$, FIG. 3a shows the drag gradient $ng_{E\_W}$ and the braking gradient $ng_{E\_Br}$ of the input shaft in a simplified, linearized form relative to the output speed gradient $ng_A$, whereas the switching condition of the control valves of the transmission brake shown in FIG. 3b corresponds to the representation in FIG. 2c. From the representation in FIG. 3a it follows directly that:

$$\Delta n_1 = T_1(ng_{E\_W} - ng_A)$$

$$n_3 + \Delta n_4 = (T_3 + T_4)(ng_{E\_Br} + ng_{E\_W} - n_A)$$

$$2\Delta n_5 = T_5[ng_{E\_Br} + 2(ng_{E\_W} - ng_A)]$$

Using the above-mentioned equation for the application duration $T_H$ of the transmission brake and the equation derived in DE 10 2010 002 764 A1 for a complete reduction of the braking torque $M_{Br}$:

$$T_5 = -1/(2F_{Abs})ng_{E\_Br},$$

in which $F_{Abs}$ is a transmission-specific and brake-specific deactivation factor, the third-from-last equation above becomes:

$$\Delta n_3 + \Delta n_4 = T_H(ng_{E\_Br} + ng_{E\_W} - ng_A)$$

and the second-from-last equation becomes:

$$2\Delta n_5 = -1/(2F_{Abs})ng_{E\_Br}[ng_{E\_Br} + 2(ng_{E\_W} - ng_A)]$$

By inserting these relationships in the equation for $\Delta n$ and therein replacing $\Delta n$ by the equation with $n_{E\_0}$, $n_{A\_0}$ and $ng_A$ first-mentioned above, replacing $T_5$ by the aforesaid overall relationship with $T_1$, $T_H$ and $T_5$, and also replacing $T_5$ by the known formula with $F_{Abs}$ and $ng_{E\_Br}$, the following quadratic equation is obtained for the braking gradient $ng_{E\_Br}$ sought:

$$0 = n_{E\_0} - n_{A\_0} + (T_1 + T_H)(ng_{E\_W} - 2ng_A) + [T_H - 1/F_{Abs}(ng_{E\_W} - 2ng_A)]*ng_{E\_Br} - 1/(2F_{Abs})*ng_{E\_Br}^2,$$

the solution of which is given by the equation:

$$ng_{E\_Br} = F_{Abs}*T_H - ng_{E\_W} + 2ng_A + \{(F_{Abs}*T_H - ng_{E\_W} + 2ng_A)^2 2F_{Abs}[n_{E\_0} - n_{A\_0} + (T_1 + T_H)(ng_{E\_W} - 2ng_A)]\}^{1/2}$$

using which the braking gradient is preferably calculated in the first process step 1 according to FIG. 1 as a function of the specified application duration $T_H$ of the transmission brake.

Figure 4:
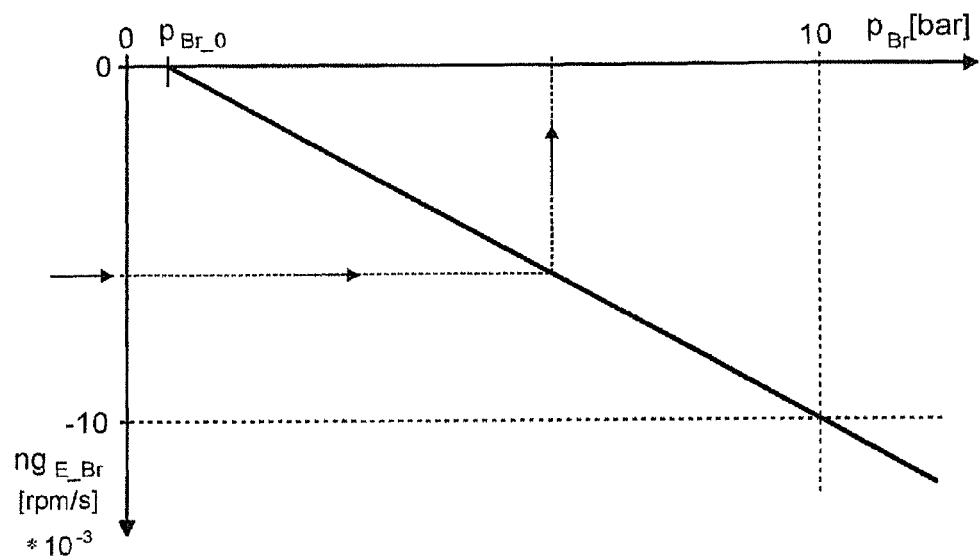

In the second process step 2 according to FIG. 1 the braking pressure $p_{Br}$ to be produced in the transmission brake in order to obtain the determined braking gradient $ng_{E\_Br}$ of the input shaft can be determined, optionally, either with reference to a characteristic line an example of which is illustrated in FIG. 4, or by calculation using the equation:

$$p_{Br} = p_{Br\_0} - ng_{E\_Br} * F_{Br}$$

in which $p_{Br\_0}$ denotes a device-specific pressure offset of the transmission brake that takes into account the spring force of a brake-internal restoring spring, and $F_{Br}$ denotes a device-specific proportionality factor of the transmission brake.

In the third process step 3 according to FIG. 1, the necessary opening duration $T_{VE}$ of the inlet valve for the brake pressure $p_{Br}$ of the transmission brake to be produced therein can be determined from a family of several characteristic curves determined for different supply pressures $p_V$, or from a single characteristic curve which has been determined from a family of characteristic curves determined for different supply pressures $p_V$.

Figure 5:
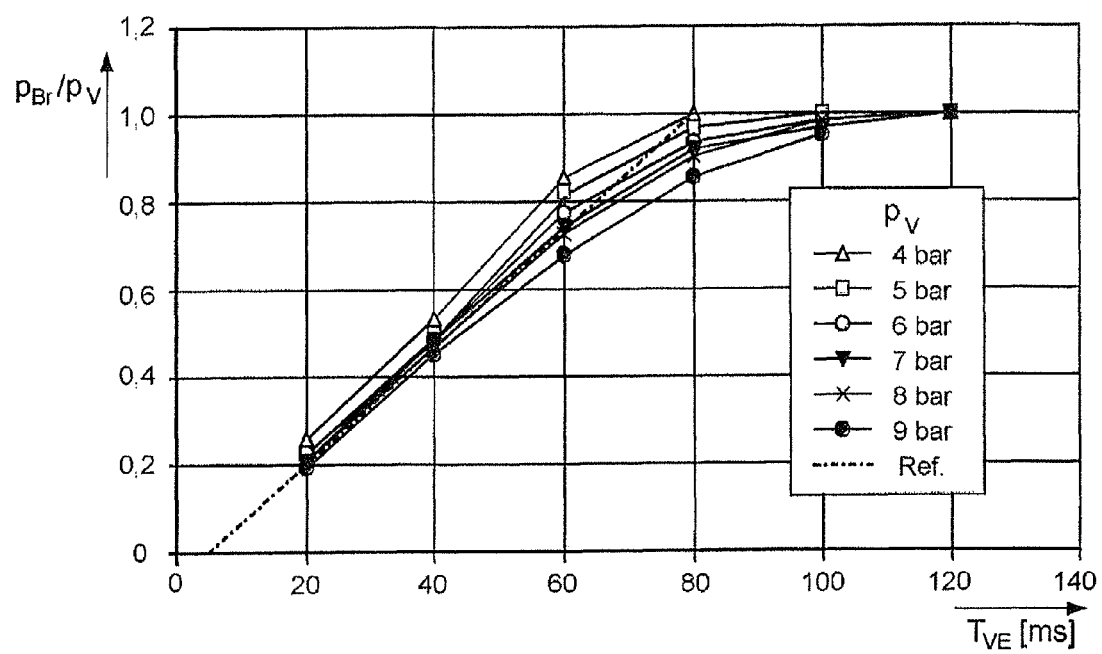

Examples of corresponding characteristic curves are shown in the diagram of FIG. 5, in which the brake pressure $p_{Br}$ to be produced, related in each case to the existing supply pressure $p_V$ of the transmission brake, is plotted against the opening duration $T_{VE}$ of the inlet valve. The diagram shows six characteristic curves determined for different supply pressures $p_V$ between 4 bar and 9 bar, as well as a linearized equalizing characteristic indicated as a dot-dash line and denoted Ref. To determine the opening duration $T_{VE}$ of the inlet valve it is thus possible to use the characteristic that corresponds to the actual supply pressure $p_v$ existing at the time, or the one closest to it. Likewise, however, it can also be provided, independently of the currently existing supply pressure $p_V$, to use the linearized equalizing characteristic shown in FIG. 5 or, alternatively, a characteristic averaged from the family of pressure-dependent characteristics (not shown in FIG. 5).

Indexes

1 First process step
2 Second process step
3 Third process step
$F_{Abs}$ Deactivation factor of the transmission brake
$F_{Br}$ Proportionality factor of the transmission brake
i Order number
i+1 Order number
$J_{GE}$ Input-side mass moment of inertia
M Torque
$M_{Br}$ Braking torque of the transmission brake
n Rotational speed
$n_A$ Output speed, synchronous speed
$n_{A\_0}$ Output speed at time t0
$n_{A\_i}$ Output speed at time $t_i$
$n_{A\_i+1}$ Output speed at time $t_{i+1}$
$n_E$ Input rotational speed
$n_{E\_0}$ Input speed at time t0
$n_{E\_i}$ Input speed at time $t_i$
$n_{E\_i+1}$ Input speed at time $t_{i+1}$
ng Rotational speed gradient
$ng_A$ Output speed gradient
$ng_E$ Input speed gradient
$ng_{E\_Br}$ Braking gradient of the input shaft
$ng_{E\_Br\_ist}$ Actual braking gradient of the input shaft
$ng_{E\_Br}*$ Braking gradient of the input shaft calculated using $p_V$
$ng_{E\_W}$ Drag gradient of the input shaft
p Pressure
$p_{Br}$ Brake pressure of the transmission brake
$p_{Br\_0}$ Offset pressure of the transmission brake
$p_V$ Pressure supplied to the transmission brake
t Time, time point
t0 Beginning of the synchronization process
t1 Time point, beginning of the braking torque build-up
t1' Time point, deactivation time of the inlet valve
t2 Time point, end of the braking torque build-up
t3 Time point, deactivation time of the outlet valve
t4 Time point, beginning of braking torque reduction
t5 Time point, end of the synchronization process
t6 Time point, end of the shifting process
$t_i$ Particular time point
$t_{i+1}$ Next time point
$T_1$ Activation lag time of the transmission brake
$T_2$ Activation duration of the transmission brake
$T_3$ Time interval with constant braking torque
$T_4$ Deactivation lag time of the transmission brake
$T_5$ Deactivation duration of the transmission brake
$T_H$ Application duration
$T_S$ Synchronization duration
$T_{VA}$ Outlet valve closing duration
$T_{VE}$ Opening duration of the inlet valve
$T_{VE\_max}$ Maximum opening duration of the inlet valve
U Control voltage of a magnetic valve
$U_{VA}$ Control voltage of the outlet valve
$U_{VE}$ Control voltage of the inlet valve
$\Delta F_K$ Correction step width of the proportionality factor $F_{Br}$
$\Delta n$ Rotational speed difference bridged
$\Delta n_1$ Speed difference bridged during time interval $T_1$
$\Delta n_2$ Speed difference bridged during time interval $T_2$
$\Delta n_3$ Speed difference bridged during time interval $T_3$
$\Delta n_4$ Speed difference bridged during time interval $T_4$
$\Delta n_5$ Speed difference bridged during time interval $T_5$

The invention claimed is:

1. A method of controlling a transmission brake of an automated change-speed transmission, of a countershaft design provided with claw clutches, the transmission brake is functionally connected, on an input side thereof to a transmission shaft and is actuated either hydraulically or pneumatically by an inlet valve and an outlet valve, each of the inlet and the outlet valves is a 2/2-way magnetic switching valve, such that, for an upshift from a gear under load to a target gear, when the loaded gear has been disengaged, to synchronize the target gear, first the inlet valve is opened and the outlet valve is closed, then to produce a substantially constant braking torque ($M_{Br}$) the inlet valve is closed after having been open for a determinable opening time duration ($T_{VE}$), and to reach a synchronous rotational speed, the outlet valve is opened after having been closed for a determinable closing time duration ($T_{VA}$), the opening time duration ($T_{VE}$) for which the inlet valve is open being determined as a function of a specified characteristic parameter of the synchronization process, the method comprising the steps of:

detecting, with sensors, an initial input rotational speed ($n_{E\_0}$) and a corresponding initial output rotational speed ($n_{A\_0}$) existing at a beginning of the synchronization process (t=t0);

determining, with a transmission control unit and from the initial input and the initial output rotational speeds, an input speed gradient ($ng_{E\_W}$) and a corresponding output speed gradient ($ng_A$) existing before activation of the transmission brake;

determining, with the transmission control unit, a necessary braking gradient ($ng_{E\_Br}$) of the input shaft from values of the determined input and the output speed gradients existing before activation of the transmission brake and from transmission-specific and brake-specific characteristic values, for a specified application duration ($T_H$) of the transmission brake at a constant braking torque ($M_{Br}$=const.);

determining, with the transmission control unit, a needed brake pressure ($p_{Br}$) to be produced in the transmission brake for obtaining the necessary braking gradient ($ng_{E\_Br}$);

determining, with the transmission control unit, the opening time duration ($T_{VE}$) of the inlet valve required in order to produce the needed brake pressure ($p_{Br}$) as a function of a current brake pressure ($p_V$) that is currently being supplied to the transmission brake; and calculating the necessary braking gradient ($ng_{E\_Br}$) from a synchronization duration ($T_S$), the input and the output rotational speeds ($n_{E\_0}$, $n_{A\_0}$) and the input and the output speed gradients ($ng_{E\_W}$, $ng_A$) at the beginning of the synchronization process (t=t0) using the equation:

$$ng_{E\_Br} = F_{Abs}*T_H - ng_{E\_W} + 2ng_A + \{(F_{Abs}*T_H - ng_{E\_W} + 2ng_A)^2 + 2F_{Abs}[n_{E\_0} - n_{A\_0} + (T_1+T_H)(ng_{E\_W} - 2ng_A)]\}^{1/2}$$

where $ng_{E\_Br}$ is the necessary braking gradient, $F_{Abs}$ is a transmission-specific and brake-specific deactivation factor of the transmission brake, $T_H$ is the specified application duration, $ng_{E\_W}$ is the input speed gradient, $ng_A$ is the output speed gradient, $n_{E\_0}$ is the input rotational speed, $n_{A\_0}$ is the output rotational speed, and $T_1$ is a device-specific activation lag time of the transmission brake.

2. The method according to claim 1, further comprising the step of calculating the transmission-specific and brake-specific deactivation factor ($F_{Abs}$) using the equation:

$$F_{Abs} = -M_{Br}/(J_{GE}*4\pi*T_5)$$

where $M_{Br}$ is a braking torque of the transmission brake at a beginning of a deactivation process, $J_{GE}$ is a mass moment of inertia of rotating components of an input-side part of the transmission, and $T_5$ is a deactivation duration of the transmission brake on an assumption that the braking torque ($MB_r$) decreases in a linear manner.

3. The method according to claim 1, further comprising the step of determining the opening time duration ($T_{VE}$) of the inlet valve as a specified maximum opening time duration ($T_{VE\_max}$), if the needed brake pressure ($p_{Br}$) to be produced in the transmission brake is higher than the current brake pressure ($p_V$) being supplied to the transmission brake ($p_{Br} > p_{Vi}$; $T_{VE} = T_{VE\_max}$).

4. A method of controlling a transmission brake of an automated change-speed transmission, of a countershaft design provided with claw clutches, the transmission brake is functionally connected, on an input side thereof to a transmission shaft and is actuated either hydraulically or pneumatically by an inlet valve and an outlet valve, each of the inlet and the outlet valves is a 2/2-way magnetic switching valve, such that for an upshift from a gear under load to a target gear, when the loaded gear has been disengaged, to synchronize the target gear, first the inlet valve is opened and the outlet valve is closed, then to produce a substantially constant torque (MBr), the inlet valve is closed after having been open for a determinable opening time duration (TVE), and to reach a synchronous rotational speed, the outlet valve is opened after having been closed for a determinable closing time duration (TVA), the opening time duration (TVE) for which the inlet valve is open being determined as a function of a specified characteristic parameter of the synchronization process, the method comprising the steps of:

detecting, with sensors, an initial input rotational speed ($n_{E\_0}$) and a corresponding initial output rotational speed ($n_{A\_0}$) existing at a beginning of the synchronization process (t=t0);

determining, with a transmission control unit and from the initial input and the initial output rotational speeds, an input speed gradient ($ng_{E\_W}$) and a corresponding output speed gradient ($ng_A$) existing before activation of the transmission brake;

determining, with the transmission control unit, a necessary braking gradient ($ng_{E\_Br}$) of the input shaft from values of the determined input and the output speed gradients existing before activation of the transmission brake and from transmission-specific and brake-specific characteristic valves, for a specified application duration ($T_H$) of the transmission brake at a constant braking torque ($M_{BR}$=const.);

determining, with the transmission control unit, a needed brake pressure ($p_{Br}$) to be produced in the transmission brake for obtaining the necessary braking gradient ($ng_{E\_Br}$);

determining with the transmission control unit, the opening time duration ($T_{VE}$) of the inlet valve required in order to produce the needed brake pressure ($p_{Br}$) as a function of a current brake pressure ($p_V$) that is currently being supplied to the transmission brake; and calculating the needed brake pressure ($P_{Br}$) to be produced in the transmission brake from the necessary braking gradient ($ng_{E\_Br}$) using the equation:

$$p_{Br} = p_{Br\_0} - ng_{E\_Br}*F_{Br}$$

wherein $P_{br}$ is the needed brake pressure to be produced in the transmission brake, $p_{Br\_0}$ is a device-specific pressure offset of the transmission brake, $ng_{E\_Br}$ is the necessary braking gradient, and $F_{Br}$ is a device-specific proportionality factor of the transmission brake.

5. The method according to claim 4, further comprising the step of correcting the device-specific proportionality factor ($F_{Br}$) of the transmission brake as a function of deviations of an actual braking gradient ($ng_{E\_Br\_ist}$) of an input shaft from the braking gradient ($ng_{E\_Br}$) to be produced, in that if deceleration of the input shaft is too slow ($|ng_{E\_Br\_ist}| < |ng_{E\_Br}|$), the device-specific proportionality factor ($F_{Br}$) is increased by a defined correction step width ($\Delta F_K$): ($F_{Br} = F_{Br} + \Delta F_K$), whereas if deceleration of the input shaft is too rapid ($|ng_{E\_Br\_ist}| > |ng_{E\_Br}|$), the device-specific proportionality factor ($F_{Br}$) is reduced by another defined correction step width ($\Delta F_K$) ($F_{Br} = F_{Br} - \Delta F_K$).

6. The method according to claim 5, further comprising the step of only correcting the device-specific proportionality factor ($F_{Br}$) of the transmission brake when, over a defined number of synchronization processes, deviations of the actual braking gradient ($ng_{E\_Br\_ist}$) of the input shaft from the braking gradient ($ng_{E\_Br}$) to be produced, that are all in the same direction, have been recorded.

7. The method according to claim 6, further comprising the step of disregarding a deviation of the actual braking gradient ($ng_{E\_Br\_ist}$) of the input shaft from the braking gradient ($ng_{E\_Br}$) to be produced when correcting the device-specific proportionality factor ($F_{Br}$), if the opening time duration ($T_{VE}$) of the inlet valve determined is in a range with large deviations of characteristic curves determined for different current brake pressures ($p_V$), from which a characteristic line used has been determined.

8. The method according to claim 5, further comprising the step of evaluating a deviation of the actual braking gradient ($ng_{E\_Br\_ist}$) of the input shaft from a calculated braking gradient ($ng_{E\_Br}^*$), for a correction of the device-specific proportionality factor ($F_{Br}$), if the needed brake pressure ($p_{Br}$) to be produced in the transmission brake is higher than the current brake pressure ($p_V$) currently being supplied to the transmission brake ($p_{Br}>p_V$), the calculated braking gradient ($ng_{E\_Br}^*$) being calculated from the current brake pressure ($p_V$) using the equation:

$$ng_{E\_Br}^* = (p_{Br\_0} - p_V)/F_{Br}$$

where $ng_{E\_Br}^*$ is the calculated braking gradient,
$p_{Br\_0}$ is a device-specific pressure offset of the transmission brake,
$p_V$ is the current brake pressure, and
$F_{Br}$ is the device-specific proportionality factor.

9. A method of controlling a transmission brake of an automated change-speed transmission, of a countershaft design provided with claw clutches, the transmission brake is functionally connected, on an input side thereof to a transmission shaft and is actuated either hydraulically or pneumatically by an inlet valve and an outlet valve, each of the inlet and the outlet valves is a 2/2-way magnetic switching valve, such that for an upshift from a gear under load to a target gear, when the loaded gear has been disengaged, to synchronize the target gear, first the inlet valve is opened and the outlet valve is closed, then to produce a substantially constant braking torque (MBr), the inlet valve is closed after having been open for a determinable opening time duration (TVE), and to reach a synchronous rotational speed, the outlet valve is opened after having been closed for a determinable closing time duration (TVA), the opening time duration (TVE) for which the inlet valve is open being determined as a function of a specified characteristic parameter of the synchronization process, the method comprising the steps of:

detecting, with sensors, an initial rotational speed ($n_{E\_0}$) and a corresponding initial output rotational speed ($n_{A\_0}$) existing at a beginning of the synchronization process (t=t0);

determining, with a transmission control unit and from the initial input and the initial output rotational speeds, an input speed gradient ($n_{E\_W}$) and a corresponding output speed gradient ($ng_A$) existing before activation of the transmission brake;

determining, with the transmission control unit, a necessary braking gradient ($ng_{E\_Br}$) of the input shaft from values of the determined input and the output speed gradients existing before activation of the transmission brake and from transmission-specific and brake-specific characteristic values, for a specified application duration ($T_H$) of the transmission brake at a constant braking torque ($M_{Br}$=const.);

determining, with the transmission control unit, a needed brake pressure ($p_{Br}$) to be produced in the transmission brake for obtaining the necessary braking gradient ($ng_{E\_Br}$);

determining, with the transmission control unit, the opening time duration ($T_{VE}$) of the inlet valve required in order to produce the needed brake pressure ($p_{Br}$) as a function of a current brake pressure ($p_V$) that is currently being supplied to the transmission brake; and determining the necessary opening time duration ($T_{VE}$) of the inlet valve for the needed brake pressure ($p_{Br}$) to be produced in the transmission brake from a family of several characteristic curves determined for different supply pressures ($p_V$).

10. A method of controlling a transmission brake of an automated change-speed transmission, of a countershaft design provided with claw clutches, the transmission brake is functionally connected, on an input side thereof to a transmission shaft and is actuated either hydraulically or pneumatically by an inlet valve and an outlet valve, each of the inlet and the outlet valves is a 2/2-way magnetic switching valve, such that for an upshift from a gear under load to a target gear, when the loaded gear has been disengaged, to synchronize the target gear, first the inlet valve is opened and the outlet valve is closed, then to produce a substantially constant braking torque (MBr), the inlet valve is closed after having been open for a determinable opening time duration (TVE), and to reach a synchronous rotational speed, the outlet valve is opened after having been closed for a determinable closing time duration (TVA), the opening time duration (TVE) for which the inlet valve is open being determined as a function of a specified characteristic parameter of the synchronization process, the method comprising the steps of:

detecting, with sensors, an initial rotational speed ($n_{E\_0}$) and a corresponding initial output rotational speed ($n_{A\_0}$) existing at a beginning of the synchronization process (t=t0);

determining, with a transmission control unit and from the initial input and the initial output rotational speeds, an input speed gradient ($n_{E\_W}$) and a corresponding output speed gradient ($ng_A$) existing before activation of the transmission brake;

determining, with the transmission control unit, a necessary braking gradient ($ng_{E\_Br}$) of the input shaft from values of the determined input and the output speed gradients existing before activation of the transmission brake and from transmission-specific and brake-specific characteristic values, for a specified application duration ($T_H$) of the transmission brake at a constant braking torque ($M_{Br}$=const.);

determining, with the transmission control unit, a needed brake pressure ($p_{Br}$) to be produced in the transmission brake for obtaining the necessary braking gradient ($ng_{E\_Br}$);

determining, with the transmission control unit, the opening time duration ($T_{VE}$) of the inlet valve required in order to produce the needed brake pressure ($p_{Br}$) as a function of a current brake pressure ($p_V$) that is currently being supplied to the transmission brake; and determining the necessary opening time duration ($T_{VE}$) of the inlet valve for the needed brake pressure ($p_{Br}$) to be produced in the transmission brake from a single characteristic line that has been determined from a family of several characteristic curves determined for different supply pressures ($p_V$).

* * * * *